UNITED STATES PATENT OFFICE.

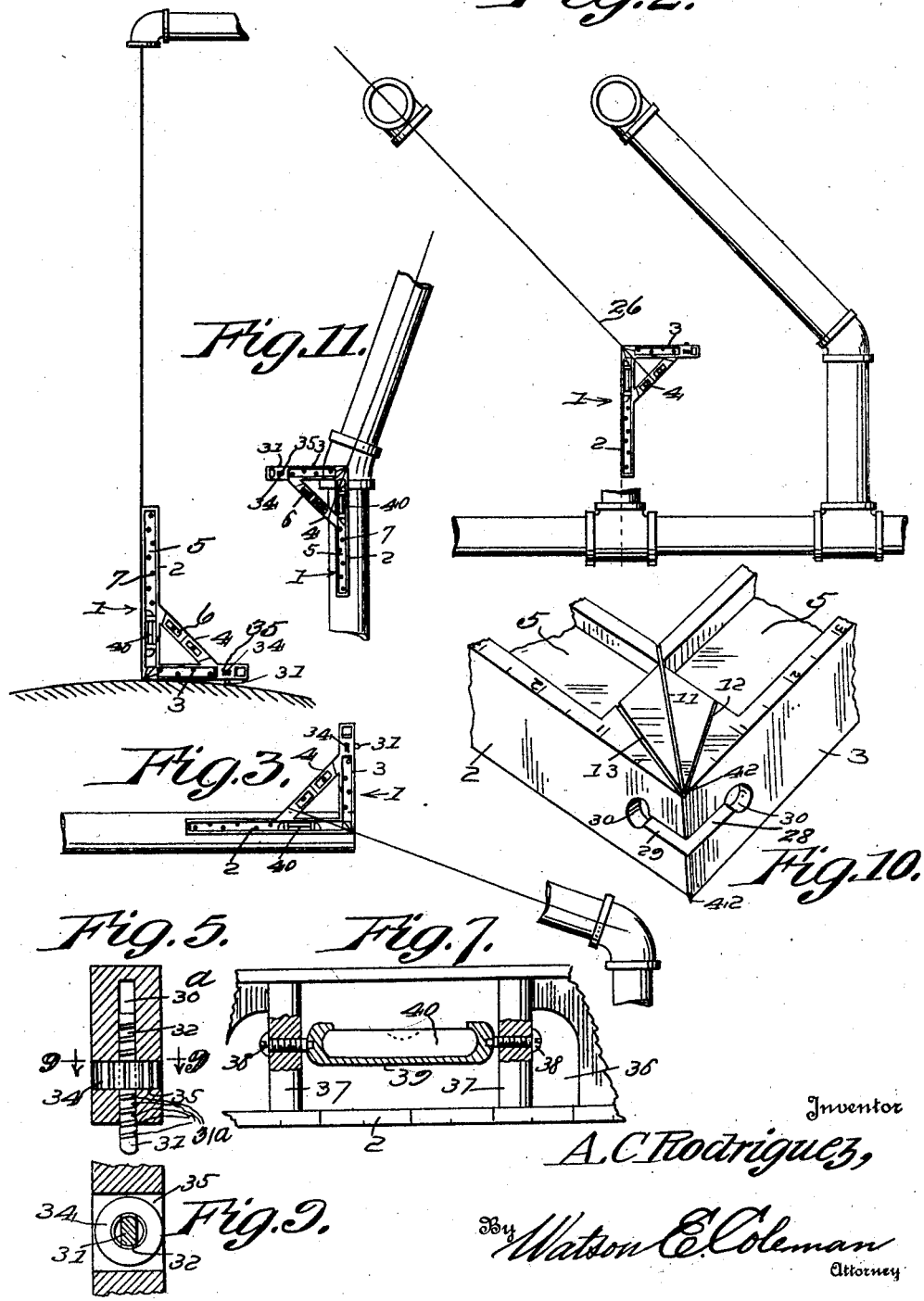

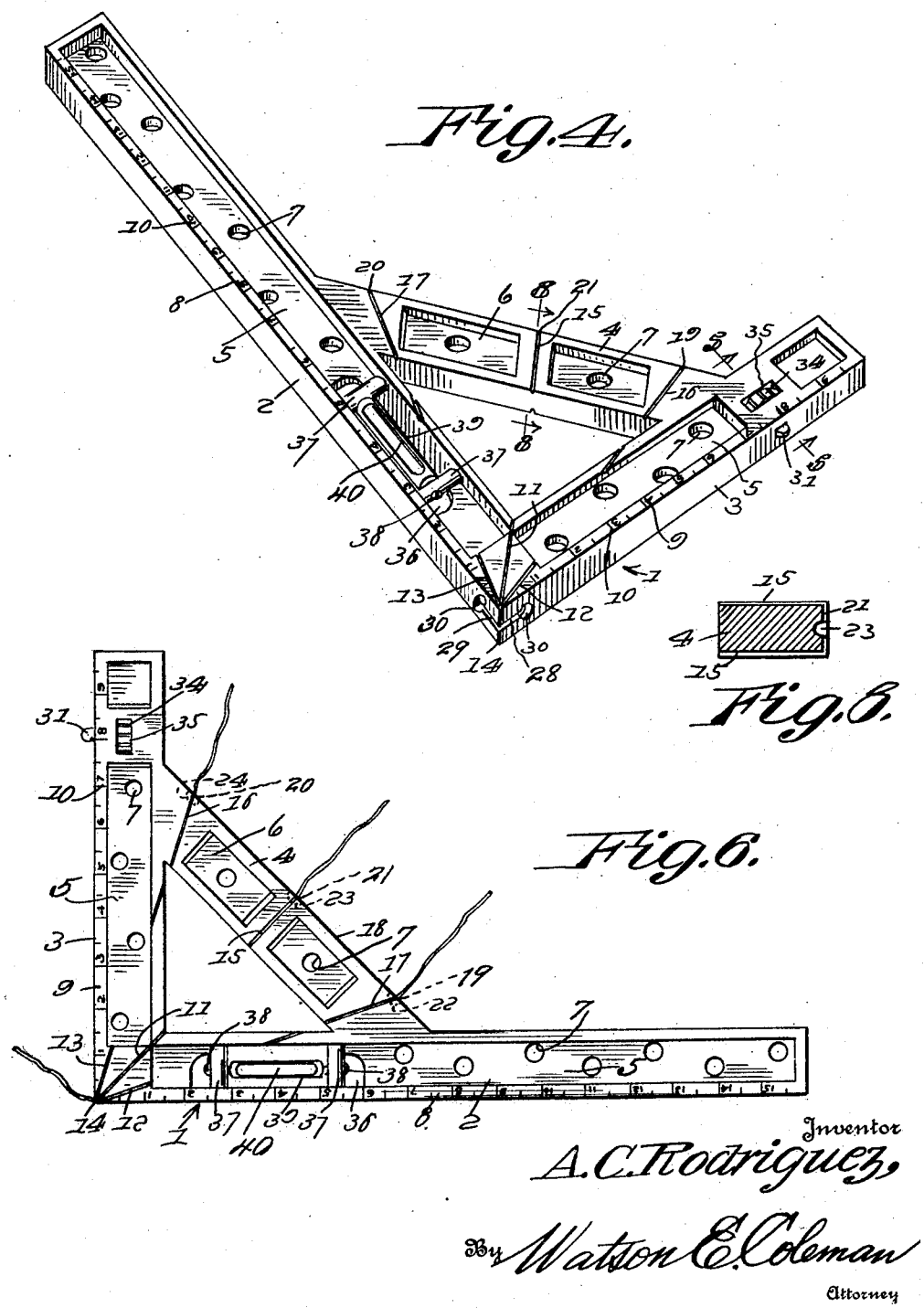

ALPHONSE C. RODRIGUEZ, OF BATON ROUGE, LOUISIANA.

PIPE-MEASURING SQUARE FOR PLUMBERS AND STEAM-FITTERS.

1,400,626.  Specification of Letters Patent.  Patented Dec. 20, 1921.

Application filed June 30, 1920. Serial No. 393,133.

*To all whom it may concern:*

Be it known that I, ALPHONSE C. RODRIGUEZ, a citizen of the United States, residing at Baton Rouge, in the parish of East Baton Rouge and State of Louisiana, have invented certain new and useful Improvements in Pipe-Measuring Squares for Plumbers and Steam-Fitters, of which the following is a specification, reference being had to the accompanying drawings.

This invention relates to an improved square adapted particularly for use by steam fitters and plumbers for measuring and gaging the positions of pipes relatively to tanks as well as relatively to other pipes, in other words, for gaging the angle of pipes, and an object of the invention is to provide a device of this kind which is very simple, inexpensive in construction and capable of being cheaply made and sold at a reasonable profit.

Another object is to provide a measuring and plumbing square of this character having means for connecting measuring lines thereto whereby the location of a pipe with relation to a tank or boiler or relatively to a furnace or to another pipe may be determined thereby insuring the proper threaded joint connections between the pipe and the boiler or furnace or the like.

Still another object is the provision of a measuring square of this design having means whereby subsequently to disposing the square adjacent a tank, boiler or the like, the square may be adjusted so that one arm of the square may be extended either radially from the tank or other curved surface or at an oblique angle to the surface of the tank.

A further object is to provide a measuring square of this design having means for leveling the square to a horizontal plane whereby one arm of the square may be disposed perpendicularly to the horizontal plane or at right angles thereto for gaging the position of a pipe relatively to a horizontal pipe, so that in connection with the means for attaching measuring lines, the positions of pipes or the like may be gaged at different angles to the perpendicular or to the horizontal plane.

Still another object is the provision of a square of this kind, the opposite edge portions of the arms of which have graduations for various measuring purposes.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view showing one application of the measuring square relatively to a boiler or tank showing the means for adjusting the position of the square whereby the measuring line may be disposed radially or at an angle to the surface of the tank or boiler.

Fig. 2 is a view showing the measuring square arranged for gaging the position of the pipe at a 45° angle to a horizontally disposed pipe and in this view the measuring square is disposed so that its longer arm extends at right angles to a pipe thereby indicating the location of the pipe to be disposed at an angle of 45°.

Fig. 3 is a view showing the square used for gaging the pipe at an angle of 22½° to another pipe.

Fig. 4 is an enlarged detail perspective view of the measuring square constructed in accordance with the invention, showing the spirit level whereby the square may be leveled and also showing the means for adjusting the square relatively to the surface of the tank.

Fig. 5 is a sectional view on line 5—5 of Fig. 4.

Fig. 6 is a plan view showing the opposite side of the square and also showing the opposing face of the square provided with means for holding measuring lines to the square.

Fig. 7 is an enlarged detail view of the supporting means of the spirit level glass holder so as to show how the holder is supported adjustably.

Fig. 8 is a sectional view on line 8—8 of Fig. 4.

Fig. 9 is a sectional view on line 9—9 of Fig. 5.

Fig. 10 is an enlarged detail perspective view of the corner of the measuring square showing more clearly the grooves 28 and 29.

Fig. 11 is a view showing another use of the measuring square, for arranging the pipe or joint on an angle of 22½° to another pipe.

Referring to the drawings, 1 designates the measuring square as a whole and which comprises the long and short arms 2 and 3. These arms extend at right angles to each other and are reinforced relatively to each other by the diagonal brace 4. The arms and the brace upon their opposite faces are channeled out as indicated at 5 and 6 in order to lighten the square which may be constructed of any suitable material either cast iron, steel or aluminum, preferably the latter. In order to further lighten the body of the square, the web portions are provided with openings 7.

The edges of the outer flanges 8 and 9 of the arms are provided with graduations 10 particularly adapted for various measuring purposes such as measuring various pipe, fittings and the like, though the square may be used for measuring other objects.

The opposite faces of the right angularly extending arms of the square are provided with grooves 11, 12 and 13. These grooves extend from the corner 14 of the square, that is to say, where the ends of the arms of the square unite. It will be noted that the groove 11 is disposed so as to intersect the surface of the brace 4 and where a measuring line would extend from the groove 11 across the brace 4, a groove 15 is provided and which alines with the groove 11. The grooves 11 and 15, it will be noted, extend at a 45° angle to the arms of the square.

The grooves 12 and 13 are also arranged so as to intersect the surface of the brace 4 and these grooves 12 and 13 extend at 22½° angles relatively to the arms 2 and 3 of the square respectively.

As shown in the several views of the drawings, a measuring line may be connected to the brace and positioned in any one of these grooves for determining the location of a pipe relatively to a horizontal plane or relatively to a perpendicular plane.

The opposite faces of the brace 4 are provided with grooves 16 and 17 which are alined with the grooves 12 and 13 respectively. Such grooves 16 and 17 as before stated are formed on the opposite sides of the brace and one edge 18 of the brace is provided with grooves 19 and 20 connecting the grooves 16 and 17 respectively of the opposite faces of the brace 4. The edge 18 of the brace 4 is also provided with a groove 21 which connects the grooves 15 and the opposite faces of the brace 4, that is the grooves which extend at 45° angles to the arms 2 and 3 of the square.

The edge 18 of the brace 4 is provided with a plurality of depressions 22, 23 and 24 which are constructed centrally of the grooves 19, 20 and 21. It will be noted that the measuring line 26 may have a knot or other means to engage any one of the depressions 22 to 24 inclusive, so that the line may then be disposed over either face of the brace 4 and engage in any one of the grooves 11, 12 and 13, whereby the line may extend from the corner of the square, and assume a position at an angle of 22½° to either arm of the square, or at an angle of 45° to both arms of the square. That is to say, when the square is disposed as shown in Fig. 2 thereby gaging the position of a pipe to be positioned at an angle of 45° either from the central portion of horizontally disposed line or from the end of a pipe extending in a horizontal plane from a horizontally disposed pipe.

The outer edge faces of the arms of the square immediately adjacent the corner thereof are provided with grooves 28 and 29 which unite immediately adjacent the corner. The ends of the grooves 28 and 29 terminate in depressions 30 and it will be noted that the knotted end of a measuring line may engage either one of said depressions and the line extended along the outer face of either one of the arms of the square so as to gage the position of a pipe to be disposed radially of or at an angle to the surface of a tank or boiler. When the square is used for this purpose as shown in Fig. 1, the short arm of the square is designed to be adjusted relatively to the face of the tank or boiler. In order to accomplish this the short arm has a transverse guide opening 30ª in which a leg or bar 31 is guided. This leg or bar is rectangular, the same as the guide opening so as to prevent turning of the leg and in order to guide the leg. The opposite edges of the leg or bar are threaded as shown at 32 and engaging the threads is a knurled nut or member 34. This knurled nut or member 34 is mounted in an opening 35 of the short arm of the square so as to hold the nut in position, yet permitting the same to rotate, and it will be noted that when the nut is rotated, the leg or bar will move relatively to the arm of the square so as to adjust the square at an angle to a cylindrical surface or other object as shown in Fig. 1.

When the square is adjusted as shown in Fig. 1 and a measuring line is connected in either one of the depressions 28 and 29, the line may extend along the outer face of either arm of the square so as to indicate or gage the position of a pipe relatively to the surface of the tank or other surface.

The longer arm of the square is provided with an opening 36 which is constructed through the web of the longer arm and extending transversely of the opening is a pair of cross pieces 37. Suitable screws 28 extend through the cross pieces 37 and engage in the opposite ends of the spirit level holder 39 thereby rotatively supporting the holder which contains a conventional form of spirit level glass 40. By means of this spirit level, the square may be properly leveled so as to dispose the measuring lines at proper positions to gage the positions and measuring the lengths of pipes or the like.

It will be noted that when the square is disposed with its longer arm extending horizontally and resting upon its edge, with the short arm disposed vertically, the holder for the spirit level may be adjusted so that the bubble of the spirit level may first extend upwardly toward the opposite edge of the longer arm and so exposed and capable of being read from either side of the opening 36, in order to level the longer arm in a horizontal plane with the short arm in a vertical or perpendicular position, thereby enabling the square to indicate the perpendicular position of a pipe.

The leg or bar 31 which is designed to engage the periphery of the boiler is provided with graduations 31ª and by registering certain of these graduations with the edge of the square, the square may be disposed so that the long arm of the square will extend substantially radially of the boiler, in order to arrange the pipes leading from the boiler in their proper directions. In other words, by registering these graduations with the edge of the short arm of the square, according to the different diameters of the boiler, it is possible to dispose the long arm of the square substantially radially of the boiler.

The measuring line 26 is used for measuring the length of a pipe section connected to a tank, furnace or boiler, even though the pipes shall be disposed at obtuse, acute or right angles. For instance the square may be disposed adjacent the tank as in Fig. 1, the line being first attached to the square, so as to measure the distance between the face of the tank or boiler and the elbow of a pipe which may extend laterally as in Fig. 1. The measuring line is then used on the side of a pipe, and the length of pipe is marked, after which the pipe is cut, and then threaded, so that it may be connected between the elbow and the side of the boiler or tank.

Referring to Fig. 2 it will be noted that the square is disposed adjacent the horizontal pipe, with the measuring line 26 extending at an angle of 45 degrees to the square, with one arm of the square at right angles to the pipe. Also in this figure it will be noted that an elbow is disposed a distance from the corner of the square. A measuring line is attached to the square at an angle of 45 degrees, then a second measuring line may be attached to the arm 2 of the square and extended over the horizontal pipe. By this arrangement and manipulation of the square the pipe fitter may determine the length of pipe sections to be connected to the horizontal pipe and the elbow, with one pipe section at a 45 degree angle to another pipe section. In other words the line 26 extending from the corner of the square to the elbow will be used to indicate the length of a pipe section to be disposed between these two points. The line 26 may be detached from the square, and where the line merges from the corner of the square, and where the line intersects the center of the elbow may be indicated on a pipe to be cut. The measuring line which may extend from the corner of the square along one edge of the arm 2 and intersect the center of the horizontal pipe may be detached and disposed along another section of pipe, and where this line intersects the first line and intersects the center of the horizontal pipe may be indicated on the pipe, and a section of pipe cut. It will thus be seen that when sections of pipes are so measured and cut, they will fit, when applied in position as shown in Fig. 2. The same principles may be followed out in measuring or determining the length of pipe sections to be disposed at angles of $22\frac{1}{2}$ degrees, as may be understood from Figs. 3 and 11.

The invention having been set forth, what is claimed as new and useful is:—

1. A plumber's and steam fitter's pipe square comprising a body having arms extending at right angles to each other, one of the arms having a spirit level and the other arm provided with an adjusting device for adjusting the square, so that one arm may extend at an angle to a surface on which the corner of the square rests for leveling the first arm according to the bubble of the spirit level.

2. A plumber's and steam fitter's pipe square comprising a body having arms, one extending at right angles to the other, one of the arms having means for adjusting the square, whereby one arm thereof may extend at an angle relatively to the surface on which the corner of the square rests, the outer edges of both arms of the square having grooves adjoining each other adjacent the corner of the square, said grooves having their remote ends provided with depressions for attaching a measuring line to the square for gaging the positions and measuring the lengths of the pipes to extend from said surface.

3. A plumber's and steam fitter's pipe square comprising a body having arms, one extending at right angles to the other, the opposite faces of the arms having graduations, a brace between the arms, the opposite faces of the square and the brace having grooves extending at angles predetermined relatively to the arms, said grooves terminating in measuring line attaching means over the central edge of the brace, whereby a measuring line may be connected to the square for gaging the positions and measuring the lengths of the pipes.

4. As an article of manufacture, a plumber's and steam fitter's pipe square, comprising a body having arms, one at right angles to the other, a spirit level carried revolubly by one arm, and means for attaching a measuring line to the corner of the square, whereby the line may extend along one face of one of the arms of the square for gaging the position and measuring the lengths of the pipe relatively to a curved or other surface of a body.

5. As an article of manufacture, a plumber's and steam fitter's pipe square, comprising a body having arms, one at right angles to the other, a spirit level carried revolubly by one arm, and means for attaching a measuring line to the corner of the square, whereby the line may extend along one face of one of the arms of the square for gaging the position and measuring the lengths of the pipe relatively to a curved or other surface of a body, and means carried by one of the arms of the square for adjusting the square to dispose the other arm at an angle relatively to a surface from which the arm extends.

6. As an article of manufacture, a plumber's and steam fitter's pipe square, comprising a body having arms, one extending at right angles to the other, one arm having a relatively long opening exposed on opposite sides of the arm, and a spirit level revolubly mounted in the opening longitudinally thereof, and to one side of the longitudinal center of the opening, whereby the bubble of the spirit level may be read from either exposed portions of the opening.

7. In a device as set forth, a body comprising arms, one extending at right angles to the other and a brace connecting said arms, one edge of the brace having a measuring line attaching means and having guide means for the line on each of the faces of the brace at right angles to said edge, whereby the line may extend across either face of the brace from the attaching means in alinement with the corner of the square.

8. In a device as set forth, a body comprising arms, one extending at right angles to the other and a brace connecting said arms, one edge of the brace having a measuring line attaching means and having guide means for the line on each of the faces of the brace at right angles to said edge, whereby the line may extend across either face of the brace from the attaching means relatively to the corner of the square, and a spirit level carried by one arm of the square and being rotatably adjustable, whereby the bubble of the spirit level may be exposed and read from either side of the arm, or read, looking in a direction at right angles to either side of the arm.

9. A plumber's and steam fitter's pipe square comprising a body having arms, one extending at right angles to the other, the outer edges of both arms having grooves converging at the corner of the square, the remote ends of the grooves having a measuring line attaching means, whereby the line may engage either one of said grooves.

10. A plumber's and steam fitter's pipe square, comprising a body having arms, one at right angles to the other, the outer edges of both arms adjacent the corner of the body having individual measuring line attaching means, for gaging the positions of and measuring the lengths of the pipes to extend from a surface, relatively to which one arm of the square may be disposed.

11. In a device of the character and for the purpose indicated, a measuring square body including arms, one extending at right angles to the other, a brace connecting said arms, and measuring line attaching means disposed adjacent where the right angle arms are adjoined, so that the measuring line may extend along either of the outer right angle edges of the arms, and line attaching means carried by one edge of the brace, said brace on its opposite faces having line guide means arranged coincident to the line attaching means of the brace, said guide means being in alinement with the attaching means and the corner of the square where the two arms unite.

In testimony whereof I hereunto set my signature.

ALPHONSE C. RODRIGUEZ.